United States Patent
Vincenzi et al.

(10) Patent No.: US 11,991,065 B2
(45) Date of Patent: May 21, 2024

(54) METHOD AND SYSTEM TO IDENTIFY NETWORK NODES/CELLS WITH PERFORMANCE SEASONALITY BASED ON TIME SERIES OF PERFORMANCE DATA AND EXTERNAL REFERENCE DATA

(71) Applicant: Telefonaktiebolaget LM Ericsson (publ), Stockholm (SE)

(72) Inventors: Simone Vincenzi, Santa Cruz, CA (US); Jieneng Yang, Santa Clara, CA (US); Yuyao Hu, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/272,771

(22) PCT Filed: Jan. 19, 2021

(86) PCT No.: PCT/IB2021/050391
§ 371 (c)(1),
(2) Date: Jul. 17, 2023

(87) PCT Pub. No.: WO2022/157537
PCT Pub. Date: Jul. 28, 2022

(65) Prior Publication Data
US 2024/0039826 A1 Feb. 1, 2024

(51) Int. Cl.
*H04L 43/50* (2022.01)
*H04L 43/08* (2022.01)
*H04W 24/08* (2009.01)

(52) U.S. Cl.
CPC ............ *H04L 43/50* (2013.01); *H04L 43/08* (2013.01); *H04W 24/08* (2013.01)

(58) Field of Classification Search
CPC ......... H04L 43/50; H04L 43/08; H04W 24/08
See application file for complete search history.

(56) References Cited

U.S. PATENT DOCUMENTS

2014/0058572 A1\* 2/2014 Stein ................. G06Q 50/06
700/291
2016/0069776 A1\* 3/2016 Cai ..................... G01M 15/14
702/35

(Continued)

FOREIGN PATENT DOCUMENTS

WO WO-2021008675 A1 \* 1/2021 ........... G06F 9/5061

OTHER PUBLICATIONS

Fawaz, et al., "Deep Learning for Time Series Classification: A Review", Data Mining and Knowledge Discovery, vol. 33, 2019, pp. 917-963.

(Continued)

*Primary Examiner* — Philip C Lee
(74) *Attorney, Agent, or Firm* — NICHOLSON DE VOS WEBSTER & ELLIOTT LLP

(57) ABSTRACT

Methods and systems are disclosed to identify network nodes/cells with performance seasonality based on time series of performance data and external reference data. A plurality of time series of data values is obtained, each time series comprising a series of data values corresponding to a performance indicator of one network node in a periodicity. A plurality of series of external reference data values in the first periodicity is also obtained. For a time series of data values, the method identifies a network node providing the time series of data values as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values.

20 Claims, 12 Drawing Sheets

(56) References Cited

U.S. PATENT DOCUMENTS

2017/0034720 A1 2/2017 Gopalakrishnan et al.
2019/0311297 A1 10/2019 Gapper
2020/0036459 A1 1/2020 Menon

OTHER PUBLICATIONS

Godor, et al., "The Signatures of City Life", Ericsson Mobility Report, Ericsson, Available Online at <https://www.ericsson.com/49de8a/assets/local/mobilityreport/documents/2014/ericsson-mobility-report-november-2014.pdf>, Nov. 2014, pp. 1-31.

Grauwin, et al., "Towards a Comparative Science of Cities: Using Mobile Traffic Records in New York, London, and Hong Kong", Computational Approaches for Urban Environments, Geotechnologies and the Environment, vol. 13, Available Online at <https://doi.org/10.1007/978-3-319-11469-9_15>, Nov. 11, 2014, 10 pages.

International Search Report and Written Opinion, PCT App. No. PCT/IB2021/050391, dated Sep. 29, 2021, 12 pages.

Jonsson, et al., "Enhancing the Event Experience", Ericsson Mobility Report, Ericsson, Available Online at <https://www.ericsson.com/49de7e/assets/local/mobility-report/documents/2017/ericsson-mobilityreport-november-2017.pdf>, Nov. 2017, pp. 1-32.

Kondor, et al., "Prediction Limits of Mobile Phone Activity Modelling", Royal Society Open Science, vol. 4:160900, Available Online at <https://doi.org/10.1098/rsos.160900>, Jan. 12, 2017, 14 pages.

NASA, "MODIS Web", Available Online at <https://modis.gsfc.nasa.gov/about/index.php>, 2020, 1 page.

Nielsen, "Chapter 8: Hierarchical Clustering", Introduction to HPC with MPI for Data Science, 2016, pp. 195-211.

Salvador, et al., "FastDTW: Toward Accurate Dynamic Time Warping in Linear Time and Space", Intelligent Data Analysis, vol. 11, No. 5, 2007, pp. 561-580.

SciPy Org, "numpy.gradient", NumPy v1.17 Manual, Available Online at <https://docs.scipy.org/doc/numpy/reference/generated/numpy.gradient.html>, 2020, 5 pages.

Vincenzi, "What Causes an Increase in Dropped Calls During the Summer?", Ericsson Blog, Available Online at <https://www.ericsson.com/en/blog/2020/5/what-causes-increased-dropped-calls-duringsummer>, May 15, 2020, 11 pages.

\* cited by examiner

METHOD AND SYSTEM TO IDENTIFY NETWORK NODES/CELLS WITH PERFORMANCE SEASONALITY BASED ON TIME SERIES OF PERFORMANCE DATA AND EXTERNAL REFERENCE DATA

CROSS-REFERENCE TO RELATED APPLICATIONS

This application is a National stage of International Application No. PCT/IB2021/050391, filed Jan. 19, 2021, which is hereby incorporated by reference.

TECHNICAL FIELD

Embodiments of the present disclosure relate to the field of networking, and more specifically, relate to methods and systems to identify network nodes/cells with performance seasonality based on time series of performance data and external reference data.

BACKGROUND ART

Telecommunication network operators often observe seasonality of network performance. For example, the dropped-call rate (DCR) increases in some seasons (such as the "summer" months in the Northern Hemisphere between late March and early October) and the increase results in degradation of network performance. There may be multiple root causes of the seasonality of network performance, as the physical environment in which a telecommunication network operates changes with season, and human behaviors are influenced and/or driven by weather, climate, time of the year, time of the week, or holidays and special events.

While it is hard to identify all the factors that contribute to the network performance seasonality, the impact of the seasonal degradation of a network performance cannot be ignored, and a network operator prefers to identify network nodes and cells with a seasonal degradation of performance so they may implement remedial measures. To do that, one may examine network performance data at the city, market, or regional level, yet the analysis to identify these network nodes and cells with seasonal performance is time consuming, even when it is feasible.

SUMMARY

Embodiments of the invention offer efficient ways to identify network nodes/cells with performance seasonality based on time series of performance data and external reference data. In one embodiment, a computer implemented method to identify performance seasonality in a network is disclosed. The method comprises obtaining, a first plurality of time series of data values, each time series comprising a series of data values corresponding to a performance indicator of one network node within a plurality of network nodes in the network, and the series of data values being ordered in a first periodicity. The method further comprises obtaining a plurality of series of external reference data values in the first periodicity, each series of external reference data values, ordered in the first periodicity, representing an environmental measure of an area covered by the one network node, wherein each external reference data value within one series of external reference data values maps in time to a data value corresponding to the performance indicator of the one network node at a same time point. For a time series of data value, the method further comprises identifying a network node providing the time series of data values as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values, wherein the dynamic time warping distance calculates a difference between two sets of data values with an optimal time point alignment, and the pair-wise distance calculates a difference between two sets of data values on the same time points.

Embodiments of the invention include electronic devices to identify network nodes/cells with performance seasonality based on time series of performance data and external reference data. In one embodiment, an electronic device comprises a processor and non-transitory machine-readable storage medium that provides instructions that, when executed by the processor, cause the electronic device to perform a method. The method comprises obtaining, a first plurality of time series of data values, each time series comprising a series of data values corresponding to a performance indicator of one network node within a plurality of network nodes in the network, and the series of data values being ordered in a first periodicity. The method further comprises obtaining a plurality of series of external reference data values in the first periodicity, each series of external reference data values, ordered in the first periodicity, representing an environmental measure of an area covered by the one network node, wherein each external reference data value within one series of external reference data values maps in time to a data value corresponding to the performance indicator of the one network node at a same time point. For a time series of data value, the method further comprises identifying a network node providing the time series of data values as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values, wherein the dynamic time warping distance calculates a difference between two sets of data values with an optimal time point alignment, and the pair-wise distance calculates a difference between two sets of data values on the same time points.

Embodiments of the invention include non-transitory machine-readable storage media that provide instructions (e.g., computer program) that, when executed by a processor of an electronic device, cause the electronic device to perform operations comprising one or more methods of the embodiments of the invention.

Through embodiments of the invention, an operator/agent of a network may identify the network nodes/cells with performance seasonality and/or group them with other nodes/cells with similar performance seasonality. The operator/agent may then implement remedial measures on the network nodes/cells prior to or during the days/months/seasons that are associated with a degradation of the performance of the network nodes/cells, so that the network performance may be improved.

BRIEF DESCRIPTION OF THE DRAWINGS

The invention may best be understood by referring to the following description and accompanying drawings that illustrate embodiments of the invention.

DETAILED DESCRIPTION

Figure 1:
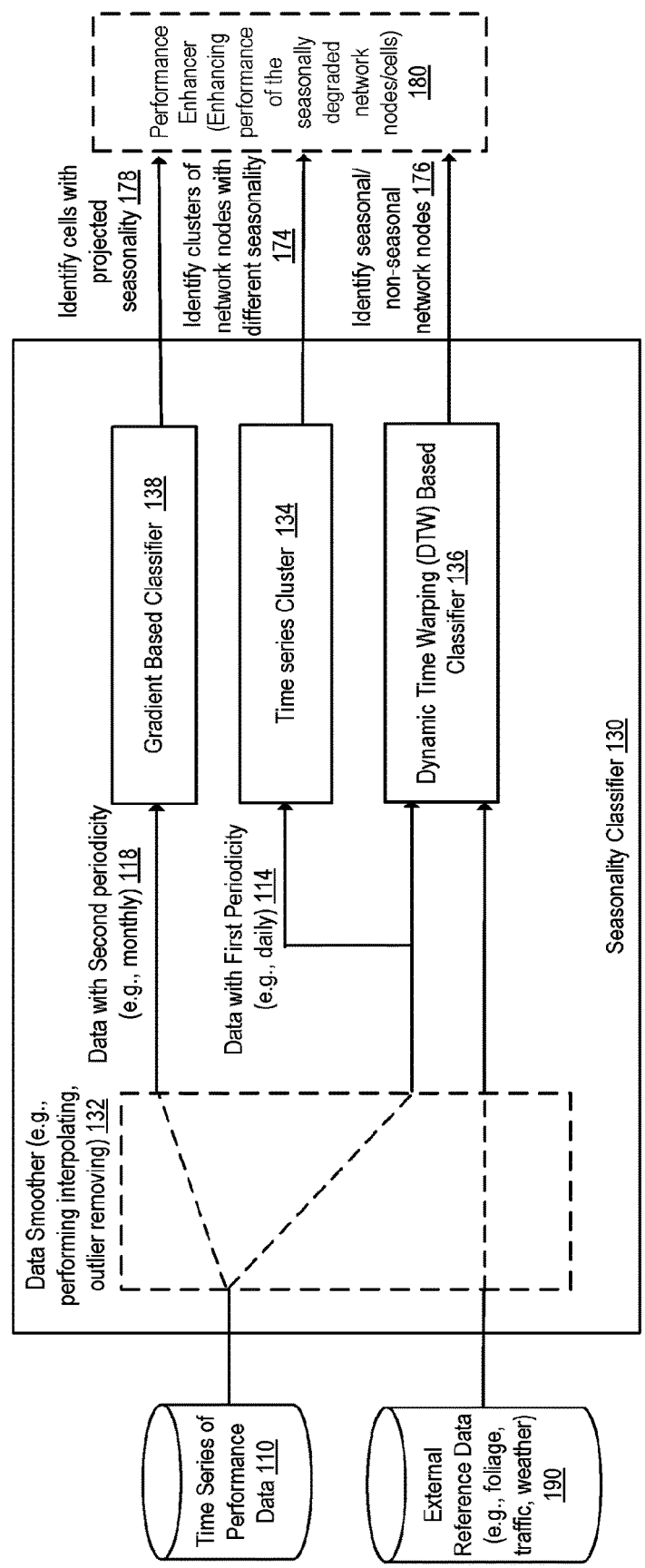
FIG. 1 shows classification of network nodes/cells based on performance seasonality per some embodiments.

The following description describes methods, apparatus, and computer programs to identify network nodes/cells with performance seasonality based on time series of performance data and external reference data. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Seasonal Network Performance Degradation and External Reference Data

The performance of a network may be measured by a set of performance indicators, referred to as key performance indicators (KPIs). Different network operators may use different sets of KPIs as the indicator of their network performance. The KPIs may be measured from the network node side or the wireless device side of the network (or by another electronic device operated by a network operator), and may indicate the performance of a network node and/or cell. For example, a set of KPIs to measure the performance of a network may include one or more of a dropped-call rate (DCR), a network throughput, a traffic latency, a packet loss rate, a retransmission rate, a reference signal received power (RSRP) level measured by a wireless device in the network, a number of connected wireless devices to a network node in the network, a total number of calls during a period at the network node, and network uptime measured at the network node/wireless device. The KPI data may be compared to corresponding quality thresholds to determine whether the network performance is acceptable. When the comparison indicates that the network performance is unacceptable, network operators may perform remedial measures to enhance network performance.

Network operators have observed that the KPI data often shows seasonality. A network node and/or its cell may perform better in some days/weeks/months/seasons while other network nodes and/or their cells perform better in different days/weeks/months/seasons. A network operator would prefer to perform the tasks of (1) differentiating network nodes and/or cells with performance seasonality from the ones without performance seasonality, (2) identifying the specific seasonality of different network nodes and/or cells (e.g., degraded in winter/summer months, particular weeks/days, etc.), (3) grouping the network nodes and/or cells with similar seasonality in the same clusters, and (4) enhancing the performance of the network nodes and/or cells during the days/weeks/months/seasons in which their performance tend to degrade. Embodiments of the present application perform one or more of the tasks. While embodiments of the present application apply to any performance indicator of a network, dropped-call rate (DCR) is used as a non-limiting example to explain the embodiments. The DCR (or the number of dropped calls), measuring calls that are terminated without any of the calling parties intentionally interrupting the call, is a measure that directly affects the calling parties' experience with a network, thus is an intuitive measure of network performance.

Network operators have observed that the dropped-call rates (DCRs) at some network nodes or cells vary over days/weeks/months/seasons. Further, the change of DCR appears to be influenced or driven by changes in weather or climate, and/or arrivals of special events/holidays, and as customers of a network change, their behavior changes accordingly. For example, office buildings are busier during the weekdays than over the weekends, so customers using their wireless devices (e.g., cellphones) may experience a higher DCR in the office during the weekdays, since office buildings may offer worse connectivity than residential buildings. People in the Northern Hemisphere tend to spend more time outside and drive their vehicles more in the summer than in the winter, and they tend to experience a higher DCR over the summer than in the winter.

Network operators, through theoretical and empirical studies, have identified variations in foliage within an area covered by a network node/cell and variations in vehicular traffic in the area as two main factors affecting the seasonal variation of DCR of the network node/cell. Intuitively, the increase of foliage and vehicle traffic may make handover of a call—the process of passing the call from one network node (e.g., a base station) to another while maintaining "best effort" connectivity to the network—either more problematic, more frequent, or both. To allow call handover to occur, the coverage of a network node/cell must overlap with that of other network nodes/cells in the area, but increased foliage may reduce the coverage overlap of the network nodes/cells by absorbing or blocking part of the radio signal, therefore making dropped calls more likely. Similarly, vehicles may absorb or block part of the radio signal and handovers are more frequent when there are changes in location during a call, such as during vehicle transportation; thus, increased vehicle traffic makes dropped calls more likely.

Even with the knowledge that foliage and vehicle traffic may have caused seasonal network performance degradation, network operators have not found straightforward solutions to differentiate network nodes/cells that tend to experience seasonal performance degradation from those that do not. The complexity of network deployment perhaps contributes to the lack of progress, as a network such as a cellular network may have hundreds or thousands of network nodes/cells at the market, city, or region level, and the time series of DCR of each node/cell in aggregation forms a tremendous volume of data. It is challenging to analyze the time series of DCR in volume along with corresponding foliage and vehicle traffic data.

With the ability to analyze data without using explicit instructions, machine learning and artificial intelligence (AI) provide good solutions to address this complex issue, as machine learning and AI rely on pattern recognition and inference to analyze large sets of data and categorize and predict past, present, and future observations. For DCR, the time series of DCR of nodes/cells and their corresponding external reference data such as foliage and vehicle traffic data in the areas covered by the respective nodes/cells may be used to identify the nodes/cell with performance seasonality. The external reference data refers to data other than that of the network performance indicators and tend to affect performance of a network node/cell. Note that just as DCR is used as a non-limiting example of a performance indicator of a network, foliage data is used as non-limiting example of external reference data that may affect/cause network performance seasonality.

Classification Based on Performance Seasonality

FIG. 1 shows classification of network nodes/cells based on performance seasonality per some embodiments. FIG. 1 includes two types of data as input. One is time series of performance data 110, which is stored in a database, and another is external reference data 190, which is stored in the same or another database. The two types of data are fed into a seasonality classifier 130, which classifies network nodes/cells of a network, and the results are provided to a performance enhancer 180 to enhance the performance of the identified seasonally degraded network nodes/cells.

The time series of performance data 110 includes multiple time series of data values corresponding to a performance indicator of network nodes within a network. For example, a time series of performance data values may be daily DCRs of a network node for 15 months. The daily data may be derived from multiple measurements throughout a day at the network node, e.g., it may be the average, median, maximum, or minimum (or results of other arithmetic operations) of the multiple daily measurements. The time series of performance data values may have another periodicity, e.g., they may be weekly, monthly, or hourly data values, and each value may be the average, median, maximum, or minimum (or results of other arithmetic operations) of the multiple measurements.

Additionally, while some network nodes have omnidirectional cells (also referred to as omnicells), others have sectorized cells, each covering one sector of a network node. A network node (or another electronic device) may collect KPI data values of its cells, and the time series of KPI data values may include performance indicator data values of the cells of network nodes as well. Note that the terms time series of performance data, time series of performance data values, and time series of KPI data values are used interchangeably herein.

The external reference data 190 includes data other than the ones indicating network performance, and they are collected for the areas covered by the network nodes/cells. The external reference data may be generated/measured by an entity other than the operator of a network. For example, the external reference data may include time series of data on foliage, weather, and/or climate of the area covered by a network node/cell. The weather or climate data may include precipitation, humidity, and/or extreme weather events such as snow and rainstorms. Additionally, the external reference data may include time series of data about human activities in the area such as human/vehicle traffic, days with special events (local marches/sports activities), weekends, and designated holidays/vacation time. The external reference data of an area covered by a network node, about natural surroundings or human activities in the area, is collectively referred to as environmental measure of the area herein as it represents the environment in which the network node operates.

The external reference data includes time series of external reference data that may be ordered in the same periodicity as that of the time series of performance data of the corresponding network node/cell. For example, for the daily DCRs of the network node for 15 months mentioned above, the corresponding external reference data may include daily foliage data for the same 15 months at the area covered by the network node/cell, and each daily DCR maps to a daily foliage data value of that day. That is, the time series of external reference data of an area maps to the time series of a network node/cell covering the same area.

The external reference data may be obtained from various sources. For example, foliage within the area is the collection of the surface occupied by leaves of plants or trees at different spatial grain, from a single tree to parks and forests, and it may be measured by various parameters or metrics. One foliage measurement is called leaf area index (LAI), which is a dimensionless quantity that can be calculated as one-sided green leaf area per unit ground area in broadleaf canopies and as half the total needle surface area per unit ground area in coniferous canopies. Another foliage measurement is vertical foliage profile (VFP) that characterizes the vertical features of plants. The external reference data may be obtained from sources such as satellites. For example, they may be imported from Moderate Resolution Imaging Spectroradiometer (MODIS) aboard the Terra (originally known as Earth Observing System (EOS) AM-1) and Aqua (originally known as EOS PM-1) satellites. The external reference data may be obtained from local authority, e.g., a local calendar indicating days with special events within a region, human/vehicle traffic data from law enforcement or transportation agencies.

The time series of performance data 110 and external reference data 190 are then fed into the seasonality classifier 130. These data may be processed by a data smoother 132 to remove noise in the data as detailed in the discussion herein below relating to FIG. 2.

The time series of performance data 110 and external reference data 190 are then provided to a dynamic time warping (DTW) based classifier 136 and time series cluster 134 at reference 114, the former of which takes data with a first periodicity and identifies the seasonal and non-seasonal network nodes at reference 176, and the latter of which takes the data with the first periodicity and identifies clusters of network nodes into different groups at reference 174, each group of network nodes having the similar seasonality. The time series of performance data 110 and external reference data 190 are also provided to a gradient based classifier 138 at reference 118, which takes the data with a second periodicity and identifies cells with projected seasonality at reference 178.

Note the DTW based classifier 136 and time series cluster 134 are used to classify network nodes, and the gradient based classifier 138 is used to classify cells in this illustrated embodiment. The embodiment is more efficient in some cases because network operators tend to maintain data values corresponding to a performance indicator at different periodicities. They may maintain KPI data daily for a network node yet the same KPI data is maintained only weekly or monthly for a cell of the network node. Since the cell related KPI data is less in volume than the network node related KPI data, it can be processed more efficiently by gradient based classifier 138 as gradient based classification tends to be computationally more intensive than the DTW based classification and time series clustering. In an alternative embodiment, when the cell related KPI data is more in volume than the network node related KPI data, the reverse may be performed, where the network node related KPI data are processed by the gradient based classifier 138 and the cell related KPI data are processed by the DTW based classifier 136 and time series cluster 134. Another embodiment may use all of the DTW based classifier 136, the time series cluster 134, and the gradient based classifier 138 on classifying/clustering network nodes or cells.

Once the seasonal and non-seasonal network nodes/cells are identified, the performance enhancer 180 is utilized to enhance the performance of the identified seasonally degraded network nodes/cells during the time that the network nodes/cells tend to degrade in performance. Note the terms "seasonally" and "seasonal" refer broadly to time-related change, and seasonal degradation may be degradation in certain days, certain day durations (e.g., weekdays or weekends), weeks, months, or seasons, not necessarily referring to only one or more seasons in a year. For example, the seasonal classifier 130 may identify a network node as tending to degrade on the Labor Day (or the Labor Day weekend) in the U.S., or a cell as tending to degrade in the first week of a new year. That is, the seasonal classifier 130 may provide forecast of daily, weekly, monthly, or seasonal performance of a network node/cell, and the performance enhancer 180 may then enhance the network node/cell on the day(s), in the day duration(s), in the week(s), month(s), or season(s), during which the network node/cell tends to have deteriorated performance.

The performance enhancer 180 may cause the power level of the network node/cell to increase during the period that it tends to have deteriorated performance, and it may cause the direction of the antenna of the network node/cell to change during the period. The performance enhancer 180 may provide indication to trigger a network operator to add more cells in an area or to reconfigure network node/cell deployment (e.g., temporarily for weeks/months/seasons) to enhance the network performance in a certain area.

The seasonality classifier 130 provides the basis for intelligently managing network performance, since the network operator may identify the network nodes/cells with performance seasonality from all the others that do not have performance seasonality, so that they may do site-by-site tuning of the network nodes/cells. When a network operator has hundreds or even thousands of nodes/cells to maintain, the seasonality classifier 130 offers tremendous saving in operational costs.

Data Smoothing

Figure 2:
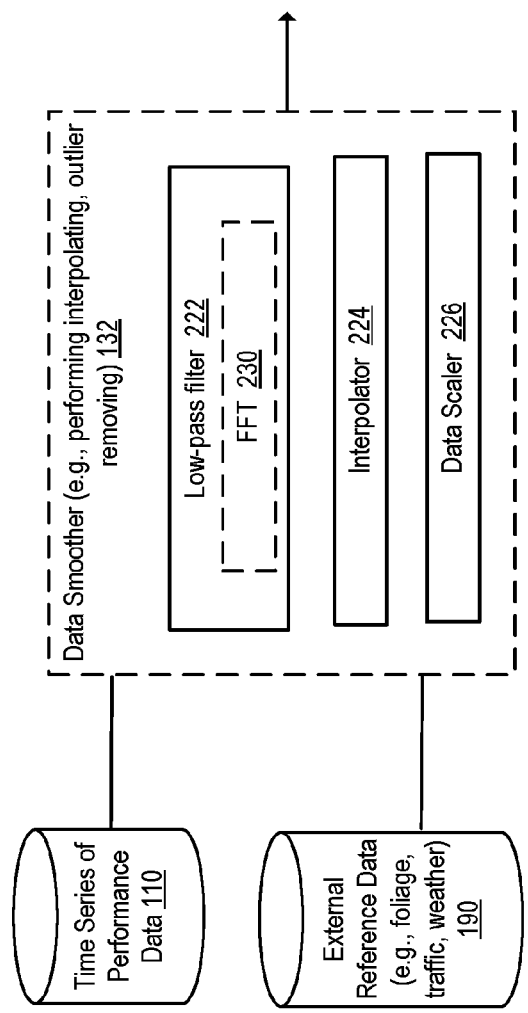
FIG. 2 shows data smoothing on the time series of data and/or external reference data per some embodiments.

FIG. 2 shows data smoothing on the time series of data and/or external reference data per some embodiments. FIG. 2 shows entities with the same references of those in FIG. 1 and they indicate elements or components having the same or similar functionalities and/or characteristics. The data smoother 132 removes "noises" in the incoming data 110 and 190 and the data smoothing may include interpolating to add missing data or deleting data that deviates significantly from the data series.

The data smoother 132 may include a low-pass filter 222. The low-pass filter 222 may filter out high-frequency components in a time series, i.e., data that changes too rapidly (e.g., over a cut-off frequency) in the time series. For example, the weekly and monthly frequency components in a daily DCR time series is at high frequency and may be filtered out. In one embodiment, a Savitzky-Golay smoothing filter, also known as least squares or digital smoothing polynomial (DISPO) filter, is selected as the main low-pass filter with a duration (e.g., 61 days) as its window size. The low-pass filter 222 may also be implemented using a Fast Fourier Transformer (FFT 230), which derives the frequency domain representation of a time series and then removes the high frequency components. Also, the low-pass filter 222 may remove data that deviates from a mean value of the data series by a threshold amount (the "outlier" data) in some embodiments.

The data smoother 132 may include an interpolator 224, which adds missing data value(s) in a time series. For example, if the incoming time series includes dropped-call rates (DCRs) at 0.095%, 0.07%, 0.09%, 0.095%, 0.10%, and 0.11%, 0.1 at days 1, 2, 4, 5, 6, and 7, the interpolator 224 may add a data point 0.08% for day 3 in the time series so the time series have a full set of data values of a week that correspond to the external reference data of the same week to be used in the seasonality classifier 130.

The data smoother 132 may also include a data scaler 226 that scales the time series of performance data and/or external reference data so that the data values are in a certain range for one or more of the DTW based classifier 136, the time series cluster 134, and the gradient based classifier 138 in some embodiments. For example, the scaler 226 may scale the data to a manageable range so that the average of the data values is zero and a standard variation is one. Note that scaling performed by the data scaler 226 is also referred to as data standardization.

The data smoother pre-processes incoming data from time series of data and/or external reference data so that the data provided to the DTW based classifier 136, the time series cluster 134, and/or the gradient based classifier 138 are not affected by noises and makes the classifiers and cluster operate more efficiently.

Dynamic Time Warping (DTW) Based Classification

Figure 3:
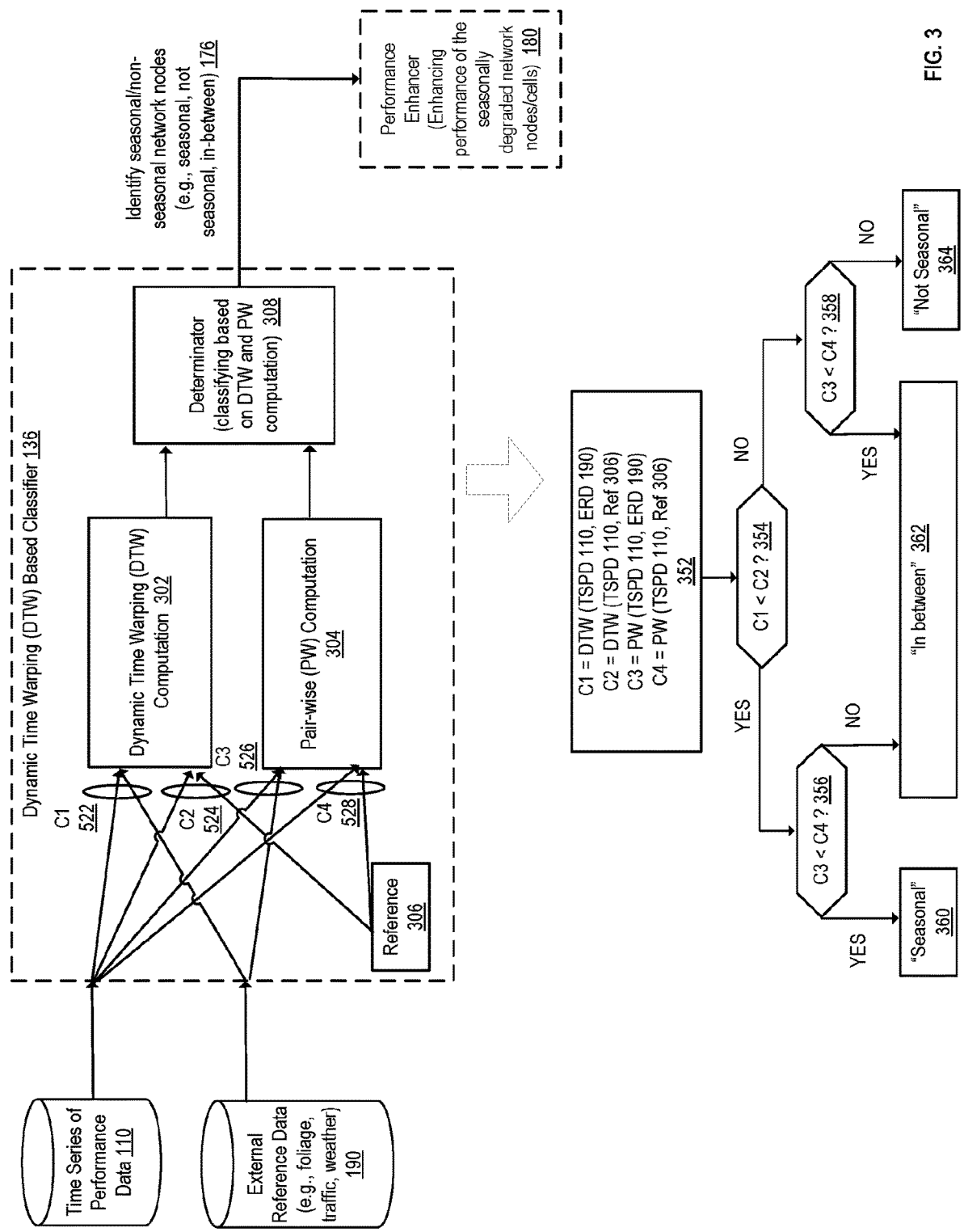
FIG. 3 shows dynamic time warping (DTW) based classification per some embodiments.

FIG. 3 shows dynamic time warping (DTW) based classification per some embodiments. FIG. 3 shows entities with the same references of those in FIG. 1 and they indicate elements or components having the same or similar functionalities and/or characteristics. The DTW based classifier 136 calculates pair-wise distances and DTW distances, and it performs classification based on the distances.

A pair-wise distance measures a distance between two time series when the two time series are aligned at the same time points. For example, the pair-wise distance between a time series of daily DCRs and a reference (REF) in a year is the summation of the absolute values of (DCR value of day n–REF (n)), i.e., $\Sigma_{n=1}^{365}|DCR(n)-REF(n)|$. The dynamic time warping distance, on the other hand, identifies the similarity between two time series under the best alignment. In one embodiment, the DTW based classifier 136 may identify the best match between two time series that satisfies all the restrictions, and that has the minimal cost, where the cost is computed as the sum of absolute differences, for each matched pair of values, between their values.

In one embodiment, the pair-wise distance computation 304 and the dynamic time warping distance computation 302 are performed among two of three inputs: (1) the time series of performance data 110, (2) the time series of external reference data 190, and (3) a reference 306. In one embodiment, the reference 306 is a horizontal line, e.g., a constant value for all time points of a time series. For example, when the data scaler 226 scales the time series of performance data to have the average value of zero in some embodiments, the constant value will be zero.

In some embodiments, the steps of references 352 to 358 are performed by a determinator 308 that classifies network nodes/cells based on the pair-wise distance computation 304 and the dynamic time warping distance computation 302. Reference 352 shows the calculation in the embodiment, where C1 at reference 522 is the dynamic time warping distance between the time series of performance data 110 of a network node and the time series of external reference data 190 of the area covered by the network node, C2 at reference 524 is the dynamic time warping distance between the time series of performance data 110 of the network node and the reference 306, C3 at reference 526 is the pair-wise distance between the time series of performance data 110 of the network node and the time series of external reference data 190 of the area covered by the network node, and C4 at reference 528 is the pair-wise distance between the time series of performance data 110 of the network node and the reference 306.

To identify a network node with performance seasonality, the calculations of C1 to C4 are for the network node, and if it is determined that C1 is less than C2 at reference 354, the flow goes to reference 356, where it is determined whether C3 is less than C4. When it is, the network node is determined to be seasonal at reference 360, otherwise the network node is determined to be "in-between"—somewhat seasonal but not seasonal enough to significantly degrade the network performance (thus won't require remedial measures to boost the network node's performance). If it is determined that C1 is not less than C2 at reference 354, the flow goes to reference 358, where it's again determined whether C3 is less than C4 at reference 358. When it is not, the network node is determined not to be seasonal at reference 364; otherwise, the network device is determined to be "in-between." The time series of performance data and its corresponding external reference data of each network node may go through the determinator 308 computation, and the network node with performance seasonality can be identified at reference 176, and performance enhancement may be performed at reference 180 as discussed herein above.

Note while the particular calculations of C1 to C4 are illustrated as a way to identify network nodes with performance seasonality in an embodiment, an alternative embodiment may use different pair-wise distances and time warping distances to determine the network node with performance seasonality. That is because the network node with performance seasonality tends to have performance data similar to the seasonally changing external reference data. One may use pair-wise distances and time warping distances differently (e.g., without using any reference such as reference 306) to identify the similarity in alternative embodiments. Also note that while the time series of performance data are performance data of a network node in the discussed example, the same DTW based classifier may be applied to cells of a network as well. In such embodiment, the time series of performance data 110 would be the performance data of cells instead of those of network nodes, but similar operations may be performed to compute the DTW and pair-wise distances and to identify the cells with performance seasonality.

The DTW based embodiments provide a universal and deterministic way to classify time series of performance data based on the seasonal variation of the time series of performance data. The DTW based embodiments can find performance seasonality even with the seasonality starting at different times for different network nodes/cell, because the DTW base embodiments search for the best alignment between time series.

Through the computation at the DTW based classifier 136, the likely degraded network nodes/cells in some days/weeks/months/seasons may be identified, so that the network operator may focus on these network nodes alone to enhance the network performance.

Clustering Network Nodes/Cells Based on Performance Seasonality

The network nodes/cells may be clustered based on performance seasonality. Such clustering may use a distance measure. In some embodiments, a distance matrix $D^{n \times n}$ with the pair-wise correlations may be used as the distance measure. A distance matrix contains the distance between each pair of items. In one embodiment, the distance between two time series of performance data reflects the seasonal variation dissimilarity between the two time series of performance data, and the distance between two identical time series of performance data should be zero.

The pair-wise correlation computes the similarity of seasonal trend patterns between each pair of items. A pair of items with correlation coefficient equal to one have the same shape of the variation in network performance regarding the performance indicator (e.g., DCR). With a correlation coefficient equal to negative one, the pair of items are perfectly negatively linearly related.

One embodiment computes a pair-wise correlation matrix $Corr^{n \times n}$, which contains the Pearson correlation coefficient between a pair of items, TSi and TSj at $Corr_{i,j}$. The distance matrix $D^{n \times n}$ is computed by $D = J^{n \times n} - Corr$ where $J^{n \times n}$ is a matrix of ones. Note that both time series of performance data and external reference data are time series of data for which the pair-wise correlation may be calculated.

Each element $Corr_{i,j}$ in the pair-wise correlation matrix $Corr^{n \times n}$ contains the Pearson correlation coefficient, a statistic that measures linear correlation between two time series $TS_i$ and $TS_j$. It has a value between +1 and −1. A value of +1 is total positive linear correlation, 0 is no linear correlation, and −1 is total negative linear correlation. Each element of the pair-wise correlation matrix may be computed through the following formula:

$$Corr_{i,j} = \frac{\sum (TS_{in} - \overline{TS_i})(TS_{jn} - \overline{TS_j})}{\sqrt{\sum (TS_{in} - \overline{TS_i})^2 \sum (TS_{jn} - \overline{TS_j})^2}} \quad (1)$$

In Formula (1), $TS_{in}$ represents each element of $TS_i$, $TS_{jn}$ represents each element of $TS_j$; $\overline{TS_i}$ and $\overline{TS_j}$ are the average of $\overline{TS_i}$, and $\overline{TS_j}$. The distance matrix is then computed through $$D = J^{n \times n} - \text{Corr}^{n \times n} = \begin{pmatrix} 1 & \cdots & 1 \\ \vdots & \ddots & \vdots \\ 1 & \cdots & 1 \end{pmatrix} - \begin{pmatrix} \text{Corr}_{1,1} & \cdots & \text{Corr}_{1,n} \\ \vdots & \ddots & \vdots \\ \text{Corr}_{n,1} & \cdots & \text{Corr}_{n,n} \end{pmatrix} \quad (2)$$

Figure 4:
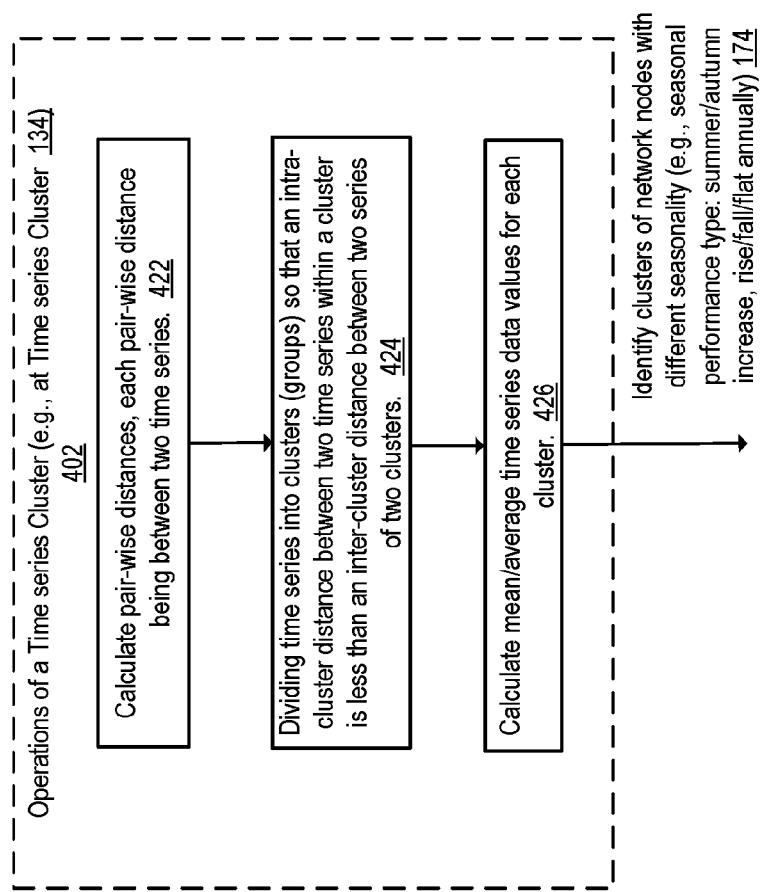
FIG. 4 shows the operations to cluster network nodes based on performance seasonality per some embodiments.

The distance matrix may then be used for clustering. FIG. 4 shows the operations to cluster network nodes based on performance seasonality per some embodiments. The operations at box 402 may be performed by the time series cluster 134 shown in FIG. 1. Each time series of performance data starts with assigning itself as a cluster. Then at reference 422, the pair-wise distances between two time series of performance data are calculated. The two clusters with the smallest cluster distance are joined into one cluster, when the smallest cluster distance is below a threshold value. The intra cluster distance between two time series is calculated between each pair of time series within a cluster. The join process of a cluster ends when the intra cluster distance goes over another threshold value upon adding another time series to the cluster in an embodiment.

The intra cluster distances are then compared with inter-cluster distances (e.g., using the distance matrix generated herein above), each inter-cluster distance being between two series of two clusters. The time series are divided into clusters (groups) so that an intra-cluster distance between two time series within a cluster is less than an inter-cluster distance between two series of two clusters at reference 424.

At reference 426, the mean or average time series value at each time point of the time series is calculated for each cluster. The network nodes that provide the time series of performance data in the same cluster are then identified as a cluster of network nodes with similar performance seasonality so that the network nodes in different clusters exhibit different performance seasonality as shown at reference 174.

Figure 5A:
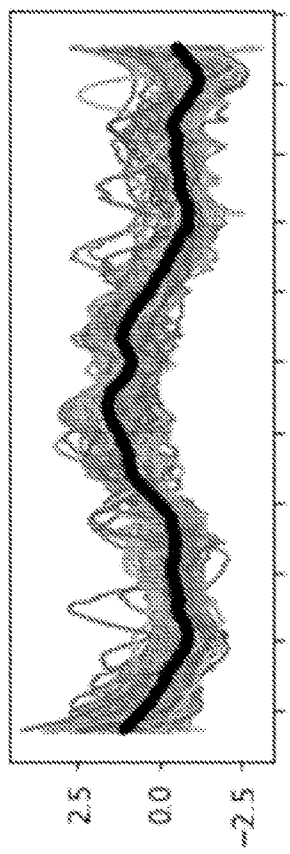
FIGS. 5A-D show the clusters of network nodes with distinct performance seasonality per some embodiments.
Figure 5B:
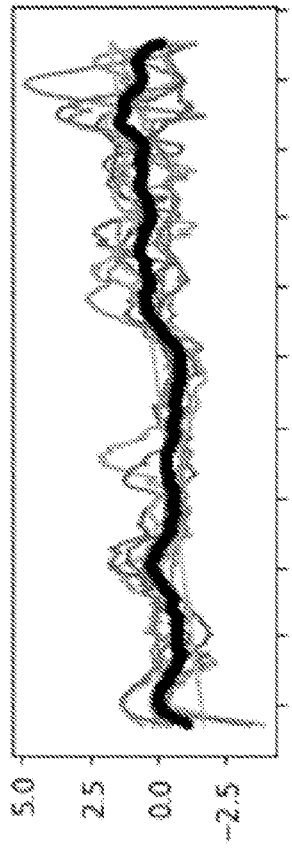
Figure 5C:
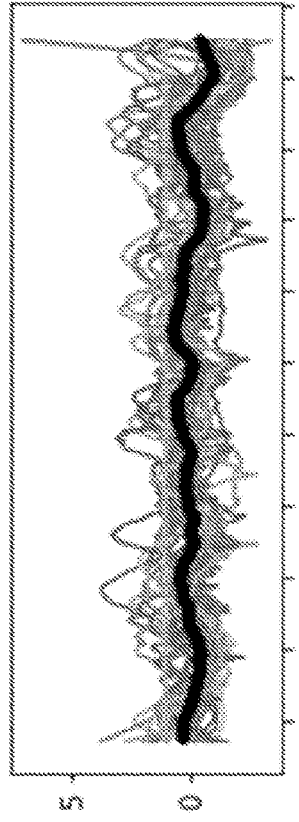
Figure 5D:
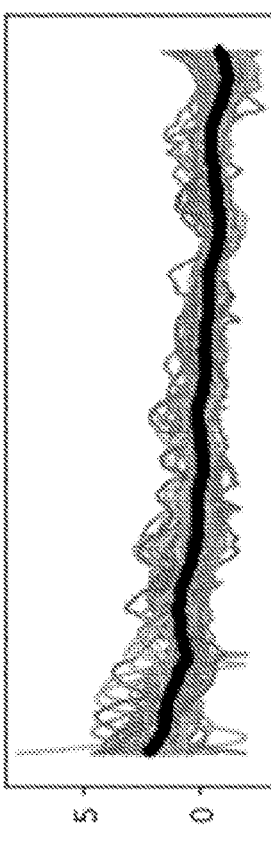

FIGS. 5A-D show the clusters of network nodes with distinct performance seasonality per some embodiments. The network performance indicator is DCR, and FIG. 5A shows that the DCRs of Cluster 0 at reference 502 increases over time. FIG. 5B shows that the DCRs of Cluster 1 at reference 504 rise over summer months between May of 2018 and September 2018, fall during winter months between September 2018 and January 2019, and rise again afterward. FIG. 5C shows that DCRs of Cluster 2 at reference 506 are largely stable over time, while FIG. 5D shows that DCRs of Cluster 3 at reference 508 trends down over time.

Knowing the characteristics of different clusters of network nodes helps a network operator to allocate resources to improve network performance. For example, the network operator does not need to allocate significant resources to network nodes in Cluster 3 to improve the DCR performance in the foreseeable future based on the fact that the network performance has been steadily improving. In contrast, the network operator should allocate significant resources to network nodes in Cluster 1 during the summer months, as the DCR performance is likely to drop.

Note that while the network node clustering is discussed in the examples of FIGS. 4-5, the same clustering may be applied to cells of a network as well. The time series of performance data 110 would be the performance data of cells instead of those of network nodes, but similar operations may be performed to cluster the time series and to identify the cells providing to the time series, so that the characteristics of different clusters of cells may be determined, and the network operator may maintain the cells accordingly.

The clustering embodiments may automatically define typical seasonality patterns for a network performance indicator such as DCRs among hundreds or even thousands of time series, with no labels and with limited user-defined input (e.g., no external reference data is needed). The clusters may be defined, for example, according to the Pearson's Correlation Coefficient, which is taken as a standardized measure of similarity in seasonal variation of the network performance indicator. In addition, the algorithm is robust to changes in the scale of data and noise, as changes in scale and noise may be filtered out by smoothing and standardization in the data smoother 132.

Gradient Based Classification

Figure 6:
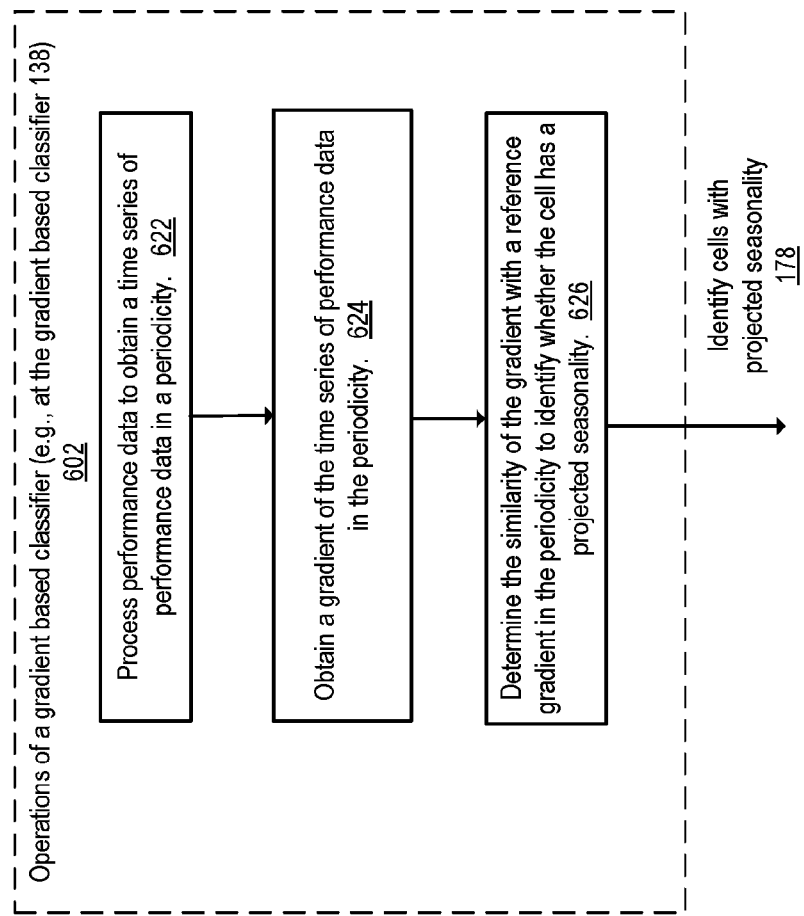
FIG. 6 shows the operations to classify cells based on performance seasonality per some embodiments.

Gradient based classification may be used to classify network node/cells with performance seasonality, and it does not require the help of external reference data. FIG. 6 shows the operations to classify cells based on performance seasonality per some embodiments. The operations at box 602 may be performed by the gradient based classifier 138 shown in FIG. 1.

At reference 622, the performance data is processed to obtain a time series of performance data of a cell in a periodicity. For example, daily performance data such as daily DCRs may be collected for each cell, yet to reduce computation, the daily DCRs may be processed to obtain weekly or monthly time series of DCRs. The process may calculate the average, median, maximum, or minimum (or results of other arithmetic operations) of the daily DCRs to get a time series of weekly/monthly DCRs.

At reference 624, a gradient of the time series of performance data is obtained. The gradient of the time series of performance data may be computed using the second-order central difference at the inner points of the time series and either first or second-order accurate one-sides (forward or backward) differences at the two boundary points of the time series. The one-side forward difference is the difference between the $n^{th}$ data element and $n+1^{th}$ data element in a time series (e.g., $f(DCR_n)-f(DCR_{n+1})$), and the one-side backward difference is the difference between the $n^{th}$ data element and $n-1^{th}$ data element in a time series (e.g., $f(DCR_n)-f(DCR_{n-1})$). The central difference is the average of the forward and backward differences. The gradient indicates the shape of the performance data and is a vector indicating value variance of that time series of performance data.

At reference 626, the similarity between the gradient of the performance data and a reference gradient is determined. The reference gradient is set to indicate a projected seasonality of the performance data. For example, if the objective is to find the cells that experience DCR increases in the summer months, the reference gradient can be set to be a vector of at least 12 data elements, each data element representing a month of a year. The values of the data elements in the reference gradient are not as important as the signs of the data elements as the signs show the increase or decrease of the values.

To project summer increase of the DCR, the signs from the first data element (mapping to January) to the seventh data element (mapping to July) may be set to be positive, while the signs from the eighth data element (mapping to August) to the twelfth data element (mapping to December) may be set to be negative, and a corresponding reference gradient can be, for example, $G_{Ref}=[0.2, 0.2, 0.2, 0.2, 0.2, 0.2, 0.2, \underline{-0.2}, -0.2, -0.2, -0.2, -0.2]$ (the change of sign happens on the eighth data element, which is underlined). Note that when the time series of performance data has more than one year's worth of data, the reference gradient can be a larger vector, e.g., when 15 months of DCR data are available, the reference gradient can be a vector of 15.

To compute the similarity between the gradient of the performance data and the reference gradient, one embodiment computes the percentage of alignment of the signs between the gradient of the performance data and the reference gradient at the same data element positions in the vectors. When the gradient matches over a first threshold (e.g., 70%), the cell is identified as having the projected seasonality. When the gradient matches less than a second threshold (e.g., 30%), the cell is identified as not having the projected seasonality, and the gradients matching in between the thresholds indicates that the seasonality of the cell is undetermined. For example, when the gradient of DCRs of a cell is $G_{DCR}$=[0.1, 0.2, 0.1, −0.1, 0.3, 0.2, 0.1, 0.1, −0.3, −0.2, 0.1, 0.3], the alignment value between it and the reference gradient $G_{Ref}$ above is 75% as eight of the twelve data elements have matching gradient signs (the mismatch data elements in the $G_{DCR}$ is in the bold font), and the cell is thus determined as having the projected seasonality.

Note that while the cells are discussed in the examples of FIG. 6, the same identification may be applied to network nodes of a network as well. In such embodiment, the time series of performance data 110 would be the performance data of network nodes instead, but similar operations may be performed, so that the network operator may identify network nodes with projected seasonality and maintain the network nodes accordingly.

The gradient based embodiments are robust to changes in scale and noise within the time series and can be applied to time series of different lengths. The robustness to changes in scale and noise is provided by the intermediate gradient sign computation, which transforms the raw time-series into binary time-series (i.e., +1 or −1 at each time point). This gradient sign computation filters out the scale and noise and, at the same time, keeps and standardizes the information about seasonal variation within each time series. By the adjustable length of the reference gradient, the gradient based embodiments may deal with different lengths of the time series.

Figure 7A:
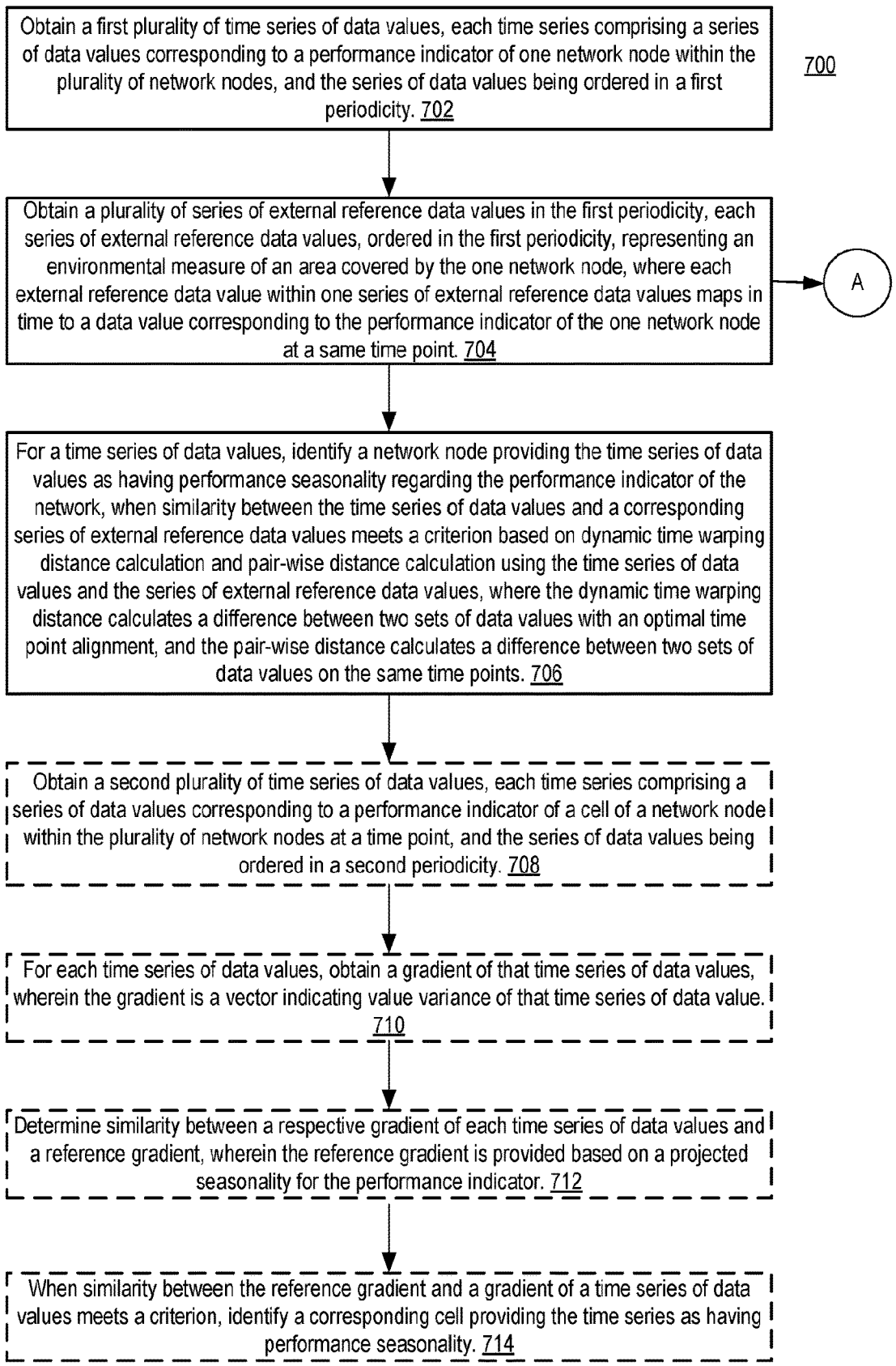
FIGS. 7A-B are a flow diagram showing the operations to identify network nodes/cells with performance seasonality based on time series of performance data and external reference data per some embodiments.
Figure 7B:
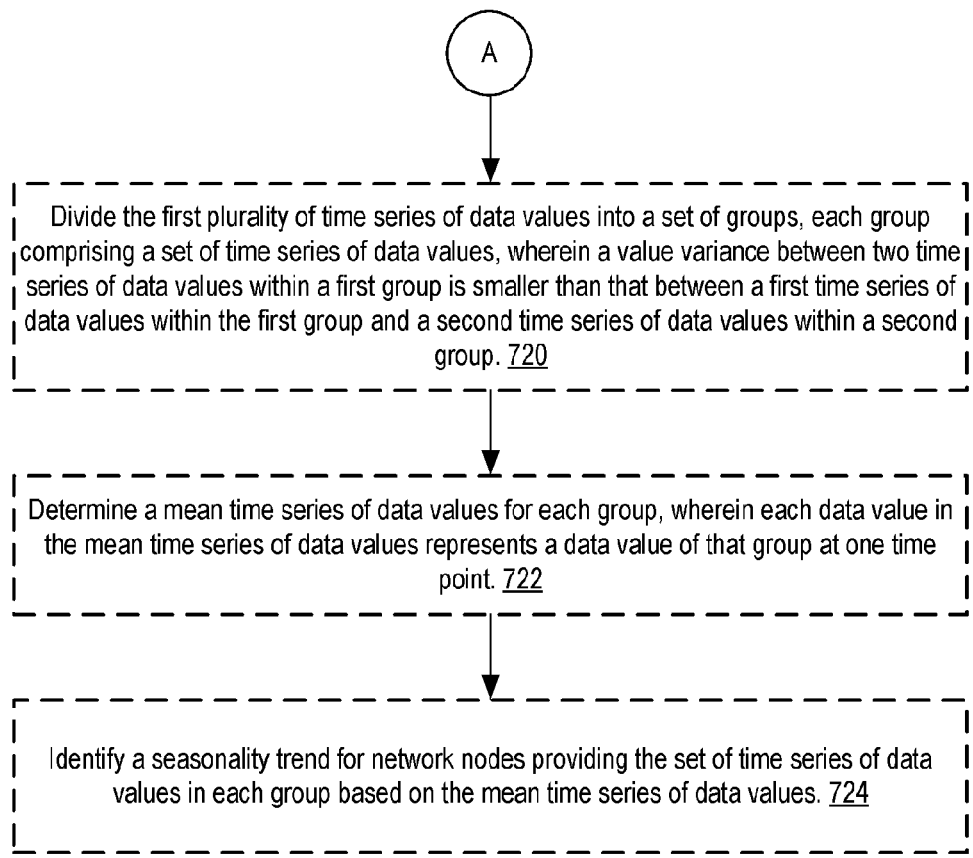

Operations to Identify Network Nodes/Cells with Performance Seasonality Per Some Embodiments FIGS. 7A-B are a flow diagram showing the operations to identify network nodes/cells with performance seasonality based on time series of performance data and external reference data per some embodiments. Method 700 may be performed by an electronic device in a network. The network includes network nodes and cells to provide services to wireless devices of the network.

At reference 702, a first plurality of time series of data values is obtained, each time series comprising a series of data values corresponding to a performance indicator of one network node within the plurality of network nodes, and the series of data values being ordered in a first periodicity. The first plurality of time series of data values may be the time series of performance data 110.

At reference 704, a plurality of series of external reference data values in the first periodicity is obtained, each series of external reference data values, ordered in the first periodicity, representing an environmental measure of an area covered by the one network node, wherein each external reference data value within one series of external reference data values maps in time to a data value corresponding to the performance indicator of the one network node at a same time point. The plurality of series of external reference data may be the external reference data 190.

At reference 706, for a time series of data values, a network node providing the time series of data values is identified as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values, where the dynamic time warping distance calculates a difference between two sets of data values with an optimal time point alignment, and the pair-wise distance calculates a difference between two sets of data values on the same time points.

The identification is explained herein above relating to FIGS. 1 and 3. In some embodiments, the dynamic time warping distance calculation and pair-wise distance calculation comprises calculating a first dynamic time warping distance between the time series of data values and the corresponding series of external reference data values, a second dynamic time warping distance between the time series of data values and a straight line (a constant value), a first pair-wise distance between the time series of data values and the corresponding series of external reference data values, and a second pair-wise distance between the time series of data values and the straight line (the constant value). In some embodiments, the network node providing the time series of data values is identified as having performance seasonality regarding the performance indicator of the network when the first dynamic distance is less than the second dynamic distance and the first pair-wise distance is less than the second pair-wise distance.

In some embodiments, the environmental measure of the area covered by the network node is one of foliage data in the area or automobile traffic data in the area. In some embodiments, the foliage data in the area comprises a leaf area index value or vertical foliage profile.

In some embodiments, the flow continues to reference 708, where a second plurality of time series of data values is obtained, each time series of the second plurality of time series of data values comprising a series of data values corresponding to the performance indicator of one cell within the network at a time point, and the series of data values being ordered in a second periodicity.

At reference 710, for each time series of data values within the second plurality of time series of data values, a gradient of that time series of data values is obtained, wherein the gradient is a vector indicating value variance of that time series of data values.

At reference 712, similarity between a respective gradient of each time series of data values within the second plurality of time series and a reference gradient is determined, where the reference gradient is provided based on a projected seasonality for the performance indicator.

At reference 714, when similarity between the reference gradient and a gradient of a time series of data values meets a criterion, a corresponding cell providing the time series is identified as having the projected seasonality.

In some embodiments, the corresponding cell providing the time series is identified as having the projected seasonality when a percentage of time points that the gradient of the time series of data values and the reference gradient have a same positive or negative gradient sign is over a threshold.

The operations of 710 to 714 are explained herein above relating to FIGS. 1 and 6.

In some embodiments, the first periodicity is daily and the second periodicity is monthly.

In some embodiments, the first and second plurality of time series of data values and the plurality of series of external reference data values are smoothed through operations discussed herein above relating to FIG. 2. In some embodiments, missing data values in at least one time series of data value is identified, and linear interpolation is applied to add in one or more missing data values into the at least one time series of data values. In some embodiments, data values that deviate over a threshold from expected values for a time series of data values are identified and removed.

In some embodiments, the performance indicator is one of the following: a call drop rate, a network throughput, a traffic latency, a packet loss rate, a retransmission rate, a reference signal received power (RSRP) level measured by a wireless device in the network, a number of connected wireless devices to a network node, a total number of calls during a period at the network node, and network uptime measured at the network node.

In some embodiments, the network node is identified as having a worse performance in a summer or winter season regarding the performance indicator of the network.

In some embodiments, the network nodes are clustered based on performance seasonality, and the flow goes to circle A next to reference 704, and circle A goes to reference 720 of FIG. 7B, where the first plurality of time series of data values is divided into a set of groups, each group comprising a set of time series of data values, where a value variance between two time series of data values within a first group is smaller than that between a first time series of data values within the first group and a second time series of data values within a second group.

At reference 722, a mean time series of data values is determined for each group, where each data value in the mean time series of data values represents a data value of that group at one time point.

At reference 724, a seasonality trend for network nodes providing the set of time series of data values in each group is identified based on the mean time series of data values.

The operations of 722 to 724 are explained herein above relating to FIGS. 1, 4, and 5A-D.

Through embodiments herein, a network operator may save tremendous manual effort to manually classify network nodes and cells as the embodiments allow the network operator to automatically identify network nodes and cells that may have performance seasonality. The network operator can then apply remedial measures on the identified network nodes and cells accordingly.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment of the invention may be implemented using different combinations of software, firmware, and/or hardware.

A wireless communication network (or "wireless network," and the two terms are used interchangeably) is a network of electronic devices communicating using radio waves (electromagnetic waves within the frequencies 30 KHz-300 GHz). The wireless communications may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire systems, and IEEE 802.11 systems.

A network node or node (also referred to as a network device (ND), and these terms are used interchangeably in this disclosure) is an electronic device in a wireless communication network via which a wireless device accesses the network and receives services therefrom. One type of network node may refer to a base station (BS) or an access point (AP), for example, a node B (NodeB or NB), an evolved NodeB (eNodeB or eNB), a next generation node B (gNB), a remote radio unit (RRU), a radio header (RH), a remote radio head (RRH), a relay, and a low power node such as a femtocell and a picocell.

A wireless device (WD) may access a wireless communication network and receive services from the wireless communication network through a network node. A wireless device may also be referred to as a terminal device, and the two terms are used interchangeably in this disclosure. A wireless device may be a subscriber station (SS), a portable subscriber Station, a mobile station (MS), an access terminal (AT), or other end user devices. An end user device (also referred to as end device, and the two terms are used interchangeably) may be one of a mobile phone, a cellular phone, a smart phone, a tablet, a wearable device, a personal digital assistant (PDA), a portable computer, an image capture terminal device (e.g., a digital camera), a gaming terminal device, a music storage and playback appliance, a smart appliance, a vehicle-mounted wireless terminal device, a smart speaker, and an Internet of Things (IoT) device. Terminal devices may be coupled (e.g., through customer premise equipment coupled to an access network (wired or wirelessly)) to edge NDs, which are coupled (e.g., through one or more core NDs) to other edge NDs, which are coupled to electronic devices acting as servers.

An Electronic Device Implementing Embodiments of the Invention

Figure 8:
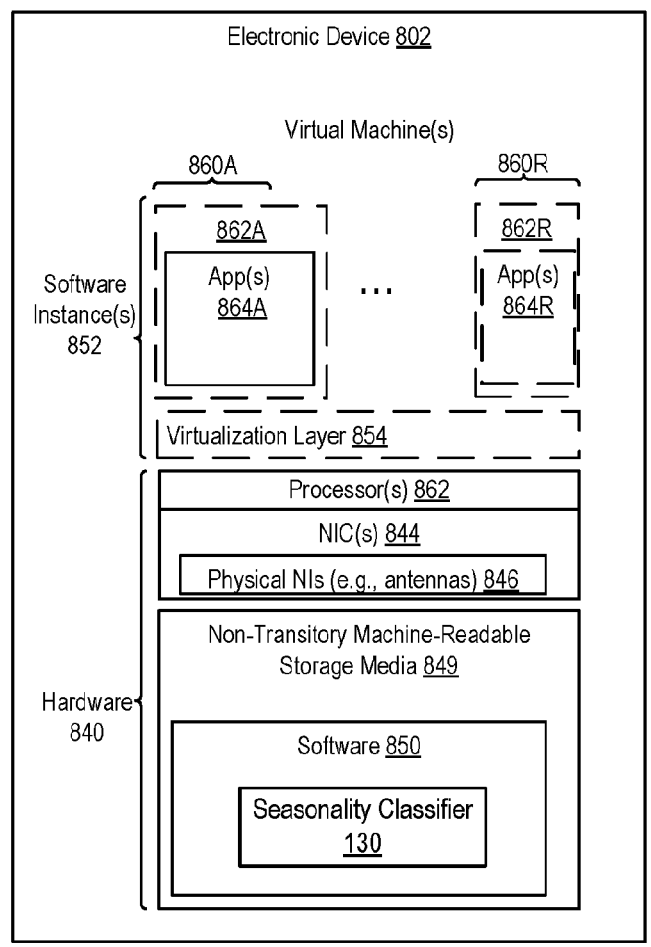
FIG. 8 shows an electronic device implementing the classification of network nodes/cells based on performance seasonality.

FIG. 8 shows an electronic device implementing the classification of network nodes/cells based on performance seasonality. The electronic device 802 may be implemented using custom application-specific integrated-circuits (ASICs) as processors and a special-purpose operating system (OS), or common off-the-shelf (COTS) processors and a standard OS.

The electronic device 802 includes hardware 840 comprising a set of one or more processors 842 (which are typically COTS processors or processor cores or ASICs) and physical NIs 846, as well as non-transitory machine-readable storage media 849 having stored therein software 850. During operation, the one or more processors 842 may execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment, the virtualization layer 854 represents a hypervisor (sometimes referred to as a virtual machine monitor (VMM)) or a hypervisor executing on top of a host operating system, and each of the sets of applications 864A-R run on top of a guest operating system within an instance 862A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The software 850 contains the seasonality classifier 130 that performs operations described with reference to FIGS. 1-7. The seasonality classifier 130 may be instantiated within the applications 864A-R. The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual electronic device 860A-R.

A network interface (NI) may be physical or virtual. In the context of IP, an interface address is an IP address assigned to an NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

A Wireless Network in Accordance with Some Embodiments

Figure 9:
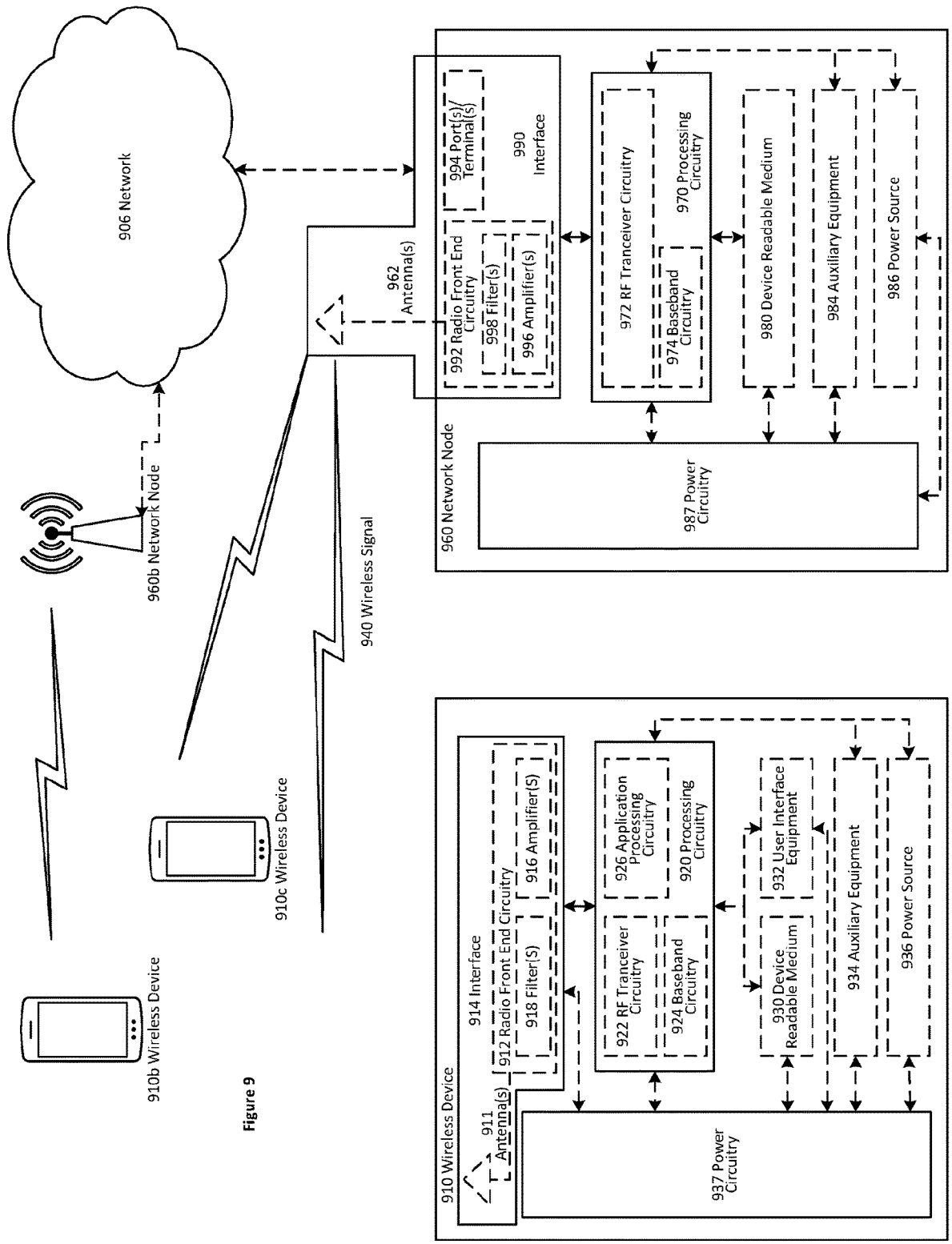
FIG. 9 shows a wireless network per one embodiment of the invention.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 961 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network. In one embodiment, one or more of the network nodes 961 and 960b, WDs 910, 910b, and 910c are installed in a fixed location thus the wireless network operates as a fixed wireless network.

The wireless network 906 may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SoC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units.

In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD), or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data, or information, including a computer program, software, an application including one or more of logic, rules, code, tables, etc., and/or other instructions capable of being executed by processing circuitry 970 and utilized by network node 960. Device readable medium 980 may be used to store any calculations made by processing circuitry 970 and/or any data received via interface 990. In some embodiments, processing circuitry 970 and device readable medium 980 may be considered to be integrated. In some embodiments, the device readable medium 980 may comprise the seasonality classifier 130.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992; instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 992 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data, and/or signals may be received from a wireless device, another network node, and/or any other network equipment. Similarly, antenna 962, interface 990, and/or processing circuitry 970 may be configured to perform any transmitting operations described herein as being performed by a network node. Any information, data, and/or signals may be transmitted to a wireless device, another network node, and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged, and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.), personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936, and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 912 is connected to antenna 911 and processing circuitry 920 and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SoC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc., and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Virtualization Environment in Accordance with Some Embodiments

Figure 10:
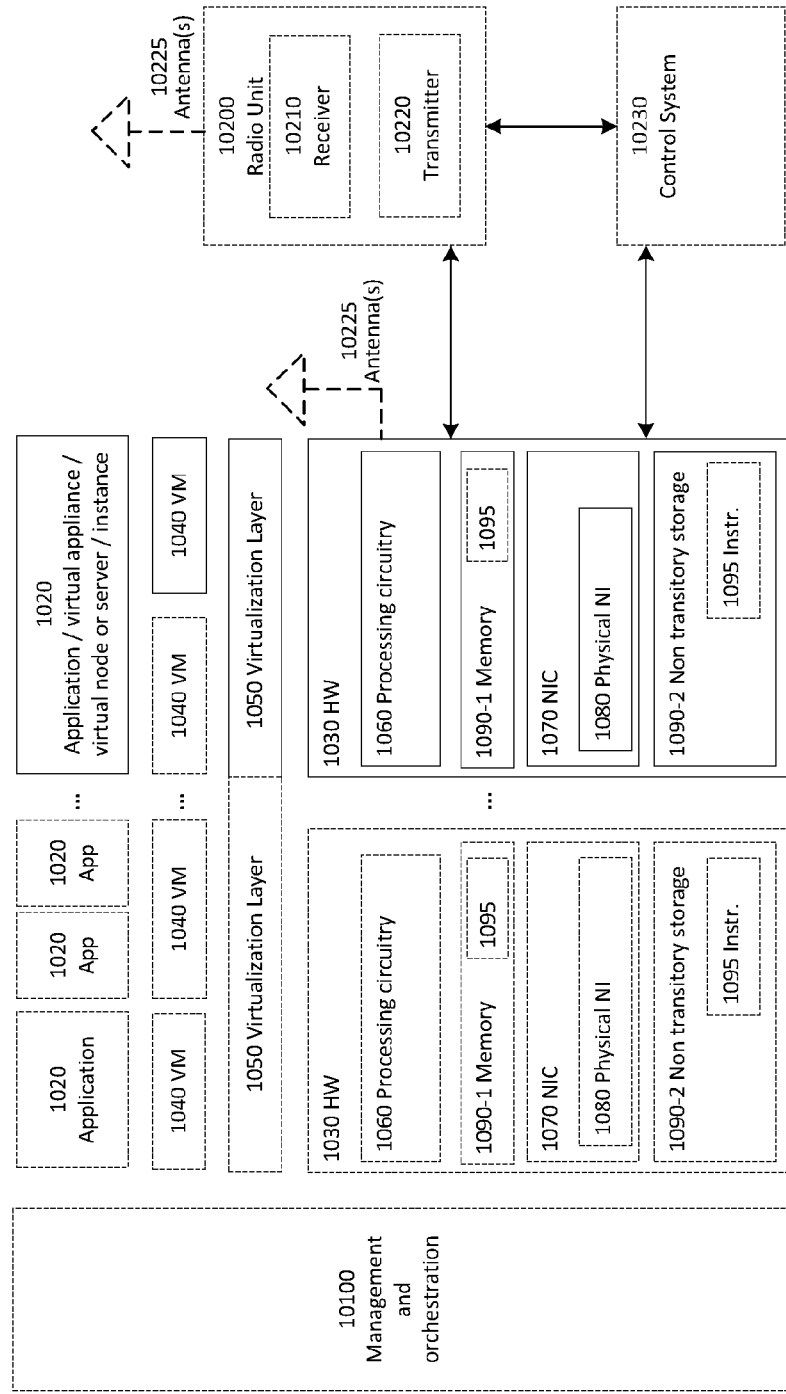
FIG. 10 shows a virtualization environment per one embodiment of the invention.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000 comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features, and/or benefits described in relation with some embodiments described herein.

Virtual machines 1040 comprise virtual processing, virtual memory, virtual networking, or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers and customer premise equipment.

In the context of NFV, virtual machine 1040 may be a software implementation of a physical machine that runs programs as if they were executing on a physical, non-virtualized machine. Each of virtual machines 1040 and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 8230 which may alternatively be used for communication between the hardware nodes 1030 and radio units 10200.

Figure 11:
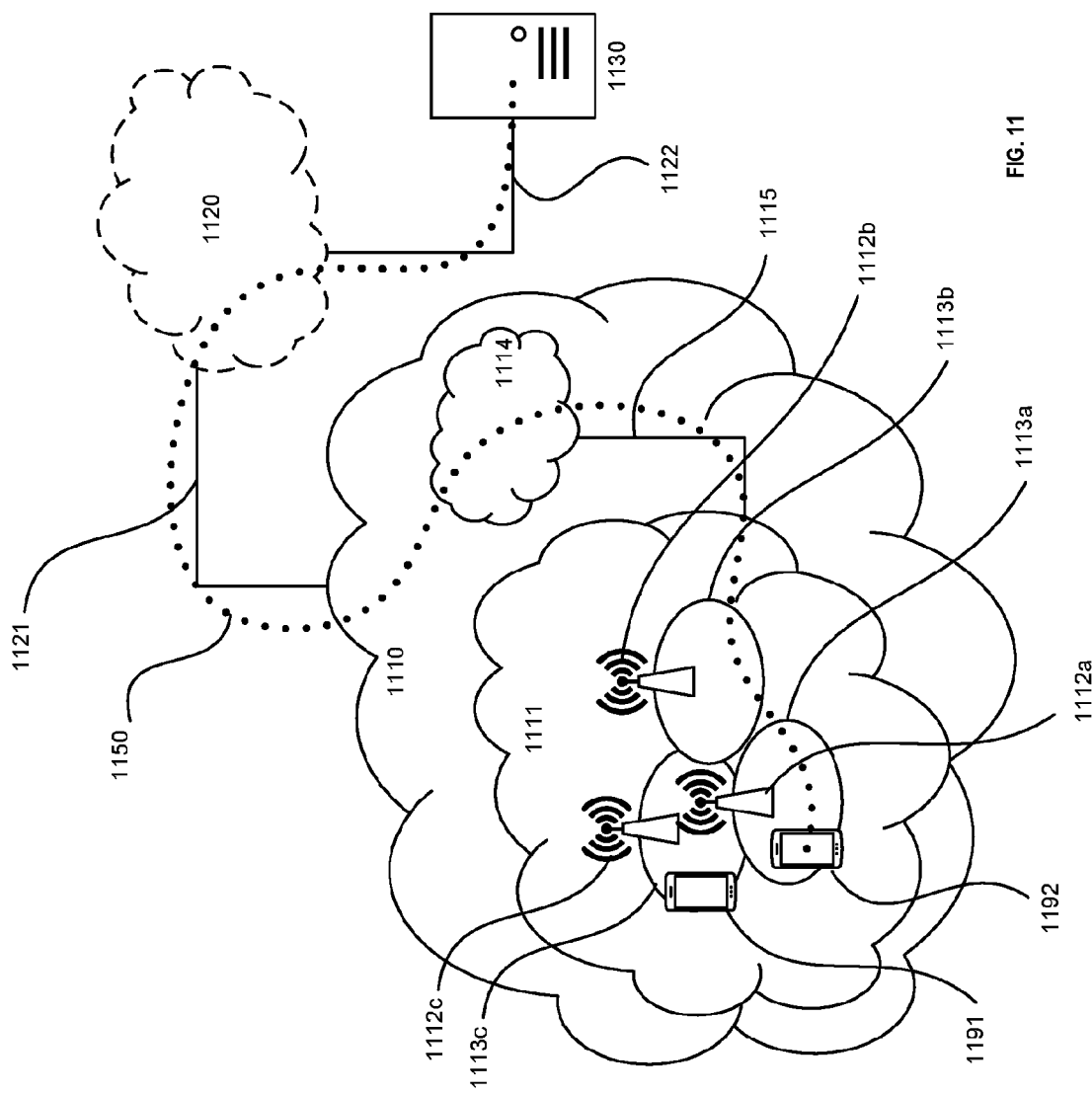
FIG. 11 shows a telecommunication network connected via an intermediate network to a host computer per one embodiment of the invention.

Telecommunication Network Connected Via an Intermediate Network to a Host Computer in Accordance with Some Embodiments With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Some of the embodiments contemplated herein above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A computer implemented method to identify performance seasonality in a network, the method comprising:
obtaining a first plurality of time series of data values, each time series comprising a series of data values corresponding to a performance indicator of one network node within a plurality of network nodes in the network, and the series of data values being ordered in a first periodicity;
obtaining a plurality of series of external reference data values in the first periodicity, each series of external reference data values, ordered in the first periodicity, representing an environmental measure of an area covered by the one network node, wherein each external reference data value within one series of external reference data values maps in time to a data value corresponding to the performance indicator of the one network node at a same time point; and
for a time series of data values, identifying a network node providing the time series of data values as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values, wherein the dynamic time warping distance calculates a difference between two sets of data values with an optimal time point alignment, and the pair-wise distance calculates a difference between two sets of data values on the same time points.

2. The method of claim 1, further comprising:
obtaining a second plurality of time series of data values, each time series of the second plurality of time series of data values comprising a series of data values corresponding to the performance indicator of one cell within the network at a time point, and the series of data values being ordered in a second periodicity;
for each time series of data values within the second plurality of time series of data values, obtaining a gradient of that time series of data values, wherein the gradient is a vector indicating value variance of that time series of data values;
determining similarity between a respective gradient of each time series of data values and a reference gradient, wherein the reference gradient is provided based on a projected seasonality for the performance indicator; and
when similarity between the reference gradient and a gradient of a time series of data values meets a criterion, identifying a corresponding cell providing the time series as having the projected seasonality.

3. The method of claim 2, wherein the corresponding cell providing the time series is identified as having the projected seasonality when a percentage of time points that the gradient of the time series of data values and the reference gradient have a same positive or negative gradient sign is over a threshold.

4. The method of claim 2, wherein the first periodicity is daily and the second periodicity is monthly.

5. The method of claim 1, further comprising:
dividing the first plurality of time series of data values into a set of groups, each group comprising a set of time series of data values, wherein a value variance between two time series of data values within a first group is smaller than that between a first time series of data values within the first group and a second time series of data values within a second group;
determining a mean time series of data values for each group, wherein each data value in the mean time series of data values represents a data value of that group at one time point; and
identifying a seasonality trend for network nodes providing the set of time series of data values in each group based on the mean time series of data values.

6. The method of claim 1, further comprising identifying and removing data values that deviate from expected values for a time series of data values over a threshold.

7. The method of claim 1, wherein the dynamic time warping distance calculation and pair-wise distance calculation comprise calculating a first dynamic time warping distance between the time series of data values and the corresponding series of external reference data values, a second dynamic time warping distance between the time series of data values and a constant value, a first pair-wise distance between the time series of data values and the corresponding series of external reference data values, and a second pair-wise distance between the time series of data values and the constant value.

8. The method of claim 7, wherein the network node providing the time series of data values is identified as having performance seasonality regarding the performance indicator of the network when the first dynamic distance is less than the second dynamic distance and the first pair-wise distance is less than the second pair-wise distance.

9. The method of claim 1, wherein the environmental measure of the area covered by the one network node is one of foliage data in the area or automobile traffic data in the area.

10. The method of claim 9, wherein the foliage data in the area comprises a leaf area index value or vertical foliage profile.

11. The method of claim 1, wherein the performance indicator is one of the following: a call drop rate, a network throughput, a traffic latency, a packet loss rate, a retransmission rate, a reference signal received power (RSRP) level measured by a wireless device in the network, a number of connected wireless devices to a network node, a total number of calls during a period at the network node, and network uptime measured at the network node.

12. The method of claim 1, wherein the network node is identified as having a worse performance in a summer or winter season regarding the performance indicator of the network.

13. An electronic device to identify performance seasonality in a network, the electronic device comprising:
a processor and non-transitory machine-readable storage medium that provides instructions that, when executed by the processor, cause the electronic device to perform:
obtaining a first plurality of time series of data values, each time series comprising a series of data values corresponding to a performance indicator of one network node within a plurality of network nodes of the network, and the series of data values being ordered in a first periodicity;
obtaining a plurality of series of external reference data values in the first periodicity, each series of external reference data values, ordered in the first periodicity, representing an environmental measure of an area covered by the one network node, wherein each external reference data value within one series of external reference data values maps in time to a data value corresponding to the performance indicator of the one network node at a same time point; and for a time series of data values, identifying a network node providing the time series of data values as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values, wherein the dynamic time warping distance calculates a difference between two sets of data values with an optimal time point alignment, and the pair-wise distance calculates a difference between two sets of data values on the same time points.

14. The electronic device of claim 13, wherein the non-transitory machine-readable storage medium provides instructions that, when executed by the processor, cause the electronic device to further perform:

obtaining a second plurality of time series of data values, each time series of the second plurality of time series of data values comprising a series of data values corresponding to the performance indicator of one cell within the network at a time point, and the series of data values being ordered in a second periodicity;

for each time series of data values within the second plurality of time series of data values, obtaining a gradient of that time series of data values, wherein the gradient is a vector indicating value variance of that time series of data values;

determining similarity between a respective gradient of each time series of data values and a reference gradient, wherein the reference gradient is provided based on a projected seasonality for the performance indicator; and when similarity between the reference gradient and a gradient of a time series of data values meets a criterion, identifying a corresponding cell providing the time series as having the projected seasonality.

15. The electronic device of claim 13, wherein the non-transitory machine-readable storage medium provides instructions that, when executed by the processor, cause the electronic device to further perform:

dividing the first plurality of time series of data values into a set of groups, each group comprising a set of time series of data values, wherein a value variance between two time series of data values within a first group is smaller than that between a first time series of data values within the first group and a second time series of data values within a second group;

determining a mean time series of data values for each group, wherein each data value in the mean time series of data values represents a data value of that group at one time point; and identifying a seasonality trend for network nodes providing the set of time series of data values in each group based on the mean time series of data values.

16. The electronic device of claim 13, wherein the performance indicator is one of the following: a call drop rate, a network throughput, a traffic latency, a packet loss rate, a retransmission rate, a reference signal received power (RSRP) level measured by a wireless device in the network, a number of connected wireless devices to a network node, a total number of calls during a period at the network node, and network uptime measured at the network node.

17. A non-transitory machine-readable storage medium that provides instructions that, when executed by a processor of an electronic device, cause the electronic device to perform:

obtaining a first plurality of time series of data values, each time series comprising a series of data values corresponding to a performance indicator of one network node within a plurality of network nodes within a network, and the series of data values being ordered in a first periodicity;

obtaining a plurality of series of external reference data values in the first periodicity, each series of external reference data values, ordered in the first periodicity, representing an environmental measure of an area covered by the one network node, wherein each external reference data value within one series of external reference data values maps in time to a data value corresponding to the performance indicator of the one network node at a same time point; and for a time series of data values, identifying a network node providing the time series of data values as having performance seasonality regarding the performance indicator of the network, when similarity between the time series of data values and a corresponding series of external reference data values meets a criterion based on dynamic time warping distance calculation and pair-wise distance calculation using the time series of data values and the series of external reference data values, wherein the dynamic time warping distance calculates a difference between two sets of data values with an optimal time point alignment, and the pair-wise distance calculates a difference between two sets of data values on the same time points.

18. The non-transitory machine-readable storage medium of claim 17, wherein the machine-readable storage medium provides instructions that, when executed by the processor, cause the electronic device to further perform:

obtaining a second plurality of time series of data values, each time series of the second plurality of time series of data values comprising a series of data values corresponding to the performance indicator of one cell within the network at a time point, and the series of data values being ordered in a second periodicity;

for each time series of data values within the second plurality of time series of data values, obtaining a gradient of that time series of data values, wherein the gradient is a vector indicating value variance of that time series of data values;

determining similarity between a respective gradient of each time series of data values and a reference gradient, wherein the reference gradient is provided based on a projected seasonality for the performance indicator; and when similarity between the reference gradient and a gradient of a time series of data values meets a criterion, identifying a corresponding cell providing the time series as having the projected seasonality.

19. The non-transitory machine-readable storage medium of claim 17, wherein the machine-readable storage medium provides instructions that, when executed by the processor, cause the electronic device to further perform:

dividing the first plurality of time series of data values into a set of groups, each group comprising a set of time series of data values, wherein a value variance between two time series of data values within a first group is smaller than that between a first time series of data values within the first group and a second time series of data values within a second group;

determining a mean time series of data values for each group, wherein each data value in the mean time series of data values represents a data value of that group at one time point; and identifying a seasonality trend for network nodes providing the set of time series of data values in each group based on the mean time series of data values.

20. The non-transitory machine-readable storage medium of claim 17, wherein the performance indicator is one of the following: a call drop rate, a network throughput, a traffic latency, a packet loss rate, a retransmission rate, a reference signal received power (RSRP) level measured by a wireless device in the network, a number of connected wireless devices to a network node, a total number of calls during a period at the network node, and network uptime measured at the network node.

* * * * *